Figure 1:
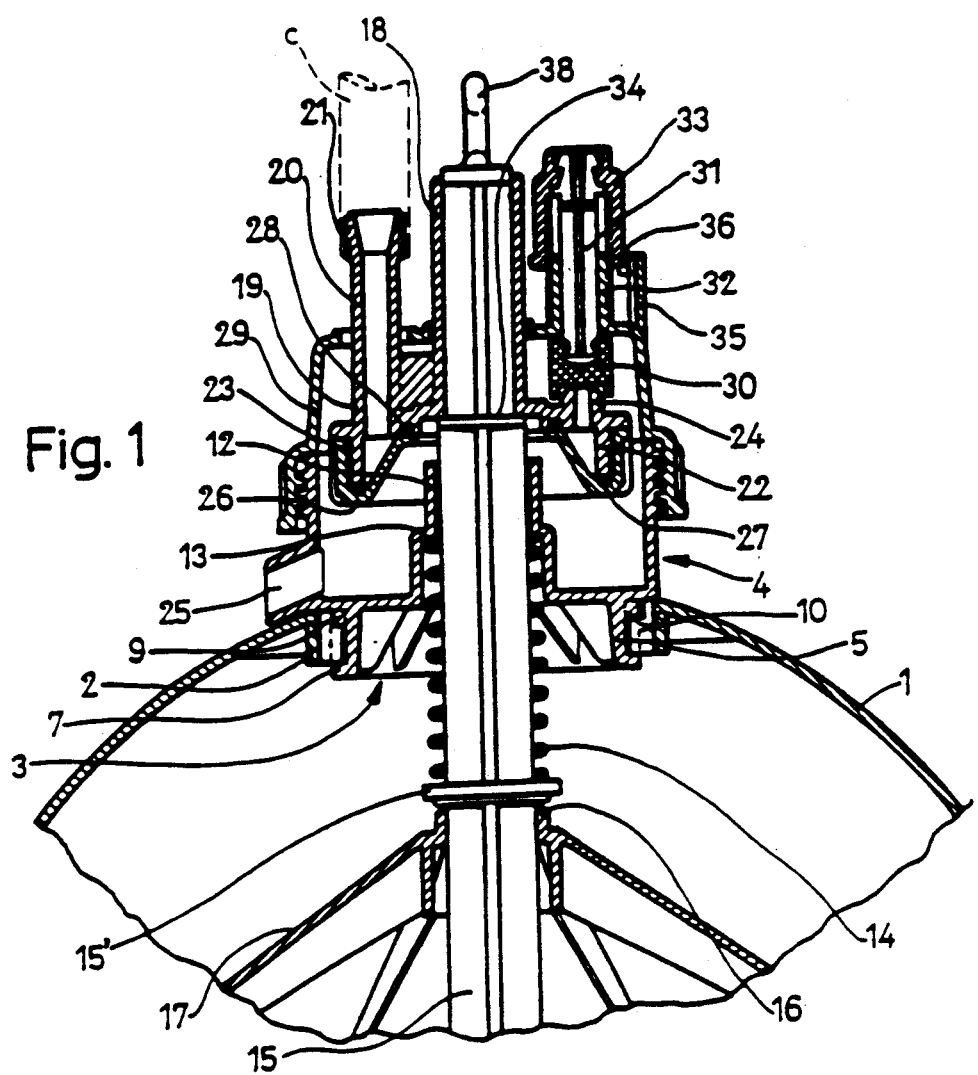

United States Patent [19]

Rovira Badía et al.

[11] Patent Number: 5,054,432
[45] Date of Patent: Oct. 8, 1991

[54] FOWL DRINKER

[75] Inventors: Antonio Rovira Badía; José Franco Tarazaga, both of Vilafranca del Penedés, Spain

[73] Assignee: Tecnica E Innovaciones Ganaderas, S.A. (TIGSA), Spain

[21] Appl. No.: 480,839

[22] Filed: Feb. 16, 1990

[30] Foreign Application Priority Data

Feb. 22, 1989 [ES] Spain .................................. 8900634
Mar. 7, 1989 [ES] Spain .................................. 8900812

[51] Int. Cl.$^5$ .............................................. A01K 7/00
[52] U.S. Cl. .................................................... 119/81
[58] Field of Search ............................ 119/79, 80, 81; 137/408

[56] References Cited

U.S. PATENT DOCUMENTS

| | | | |
|---|---|---|---|
| 4,164,201 | 8/1979 | Vanderhye | 119/81 |
| 4,180,015 | 12/1979 | Dawson, Jr. | 119/80 X |
| 4,192,257 | 3/1980 | Urzi | 119/81 |
| 4,215,653 | 8/1980 | Pirovano | 119/81 |
| 4,323,036 | 4/1982 | Salerno | 119/81 |
| 4,421,061 | 12/1983 | Shomer | 119/81 |
| 4,703,721 | 11/1987 | Uri | 119/81 |

FOREIGN PATENT DOCUMENTS 0211794 2/1987 European Pat. Off. .
2002414 8/1988 Spain .
1589337 5/1981 United Kingdom .

Primary Examiner—Gene Mancene
Assistant Examiner—R. Thomas Price
Attorney, Agent, or Firm—Cushman, Darby & Cushman

[57] ABSTRACT

A fowl drinker, having a water intake device, characterized in that the water flow adjustment means is not the same as the means with which the valve body is attached to the support column, but is formed by a stem (31) freely inserted in a tubular widened diameter portion (32) of the cup-shaped cover (29) and connected at the top and the bottom thereof, respectively, to a resilient stopper (30) engaging the spout (24) of the valve body (18) water outlet and a blind nut (33) screwed on the widened portion (32) and with which the adjustment is made, without a subsequent dismantling and reassembly of the drinker altering it, the valve body (18) being snugly fitted over the support column (15) to prevent the weight of the water supply conduit from upsetting it, affecting said regulation. The support (39) of the bushing (44) which is connected to the pipeline t comprises a flexible strip (17) surrounding said pipeline.

17 Claims, 3 Drawing Sheets

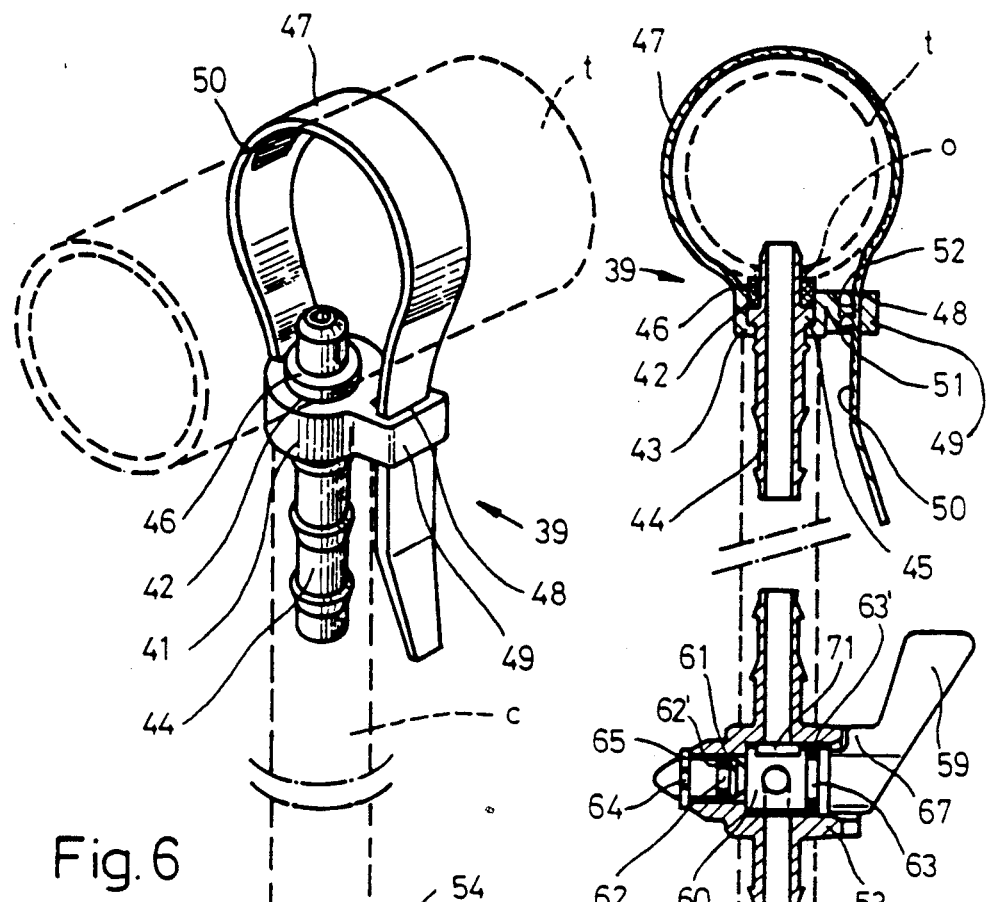
Fig. 6
Fig. 7
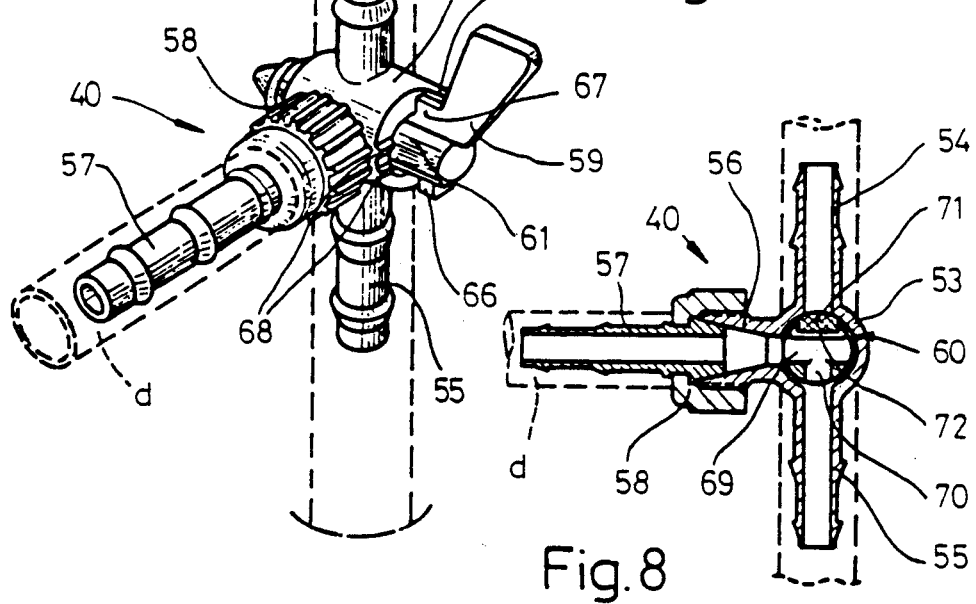
Fig. 8

FOWL DRINKER

This invention relates to a fowl drinker of the type which, installed in a suspended mode and capable of resting on the floor, comprises s counterweight and a hood forming the drinker itself which hood, by its weight, closes the water valve, allowing automatic replacement of the water as it is drunk. The drinker is attached to an intake device for drawing water from the corresponding pipeline.

There are several types of this class of drinker which have an easy-to-dismantle structure allowing for periodic cleaning, the applicant being owner of Spanish Patent of Invention No. P8602536 which relates to one of them which has been notably improved with the drinker hereof.

Thus, in the drinker according to Spanish Patent No. P8602536, the valve body, which is formed basically by a tubular member, is freely mounted around the support column emerging from the counterweight and is terminated at the top end thereof with means attaching it to said support column. At the same time this means adjusts the height position thereof to determine the flow of water to pass from the valve body to the drinker hood, which bears against the counterweight by way of an intermediate helical spring which, with the passage of the water, contracts and causes a cup-shaped cover threadedly attached to the drinker hood and arranged over the valve body to seal the water outlet thereof.

This constitution, in spite of allowing dismantling of the drinker for periodic cleaning, requires, when dismantling, manipulation of the means holding the valve body to the support column and regulating the water flow therethrough, and the water flow has to be readjusted when the drinker is reassembled Furthermore, the play of the valve body due to its free mounting around the support column means that when said valve body is connected to the conduit through which the water is supplied to the drinker, the weight of the conduit disarranges the position of the valve body, which not only affects the preset adjustment thereof, but also at times causes it to jam with other elements of the drinker surrounding it, preventing an appropriate supply of water to the drinker hood.

A further drawback is the threaded connection between the cup-shaped cover and the drinker hood, not only for the time which is wasted screwing and unscrewing the hood, to assemble or dismantle it, but also because of the requirement, during assembly, to place the cup-shaped cover appropriately over it before rotating.

To overcome these problems and drawbacks, in the present new drinker the water flow adjustment means is comprised in the cup-shaped cover which not only makes dismantling of the drinker even more easier, but also said adjustment is not affected by dismantling and does not have to be reset when the drinker is reassembled, since it is not necessary to manipulate the cover to dismantle the apparatus.

Said adjustment means is formed by a stem which is freely inserted in an upper tubular widened portion of the cup-shaped cover and which is attached, at the top end, to a blind nut which is attached, in turn, to the outer thread of the said tubular widened portion, the lower portion of the stem having attached thereto a resilient stop member associated with the spout for the flow of water from the valve body. The stop member seals the spout when the drinker hood is full of water.

This formation of the adjustment means allows the valve body to be left unmoved, whereby it may be attached to the support column. Said attachment is effected by snugly fitting the said valve body over the support column and allowing it to bear on a shoulder thereof, thereby preventing its positional situation being moved when the water flows in, and preventing also jamming and insufficient water supply to the drinker hood.

To facilitate dismantling and reassembly of the drinker hood, the present new drinker also comprises a sleeve member removably mounted to the cup-shaped cover, the open end of said sleeve member being screwed on the open end of the cup-shaped cover, said sleeve member having at the bottom end thereof a neck of appropriate shape for coupling to the neck of the drinker hood by a simple 90° rotation.

The devices for the water intake are generally formed by two members, one of which fastens a bushing connected between the pipeline and a conduit to the pipeline from which the water is taken, and another member which is interserted in the conduit and which comprises the water stopcock, which may also be provided in the former member, as happens in certain cases, although this means making a complicated, high cost member which suffers frequent faults.

Some of these drawbacks are avoided with these two members, although since there are two members, there are more parts and the financial cost of the device is still high.

To reduce said cost, there are certain extremely simply formed devices, which makes the manufacture thereof cheaper. To be precise there is one whose member which fastens the bushing to the pipeline is formed by a clamp having the bushing inserted and held therein in an orifice, both parts of the clamp embracing the pipeline and closing thereon by a tongue and groove connection of the ends.

The simplicity of this member is compounded by that of the other which is formed by two connected plate members, which comprise respective aligned external bushings which are connected to the two parts into which the conduit is divided for insertion of this member. The water flow therethrough is closed or opened by a flat bar having an orifice, which is made to move between the two plate members and which allows the water to flow through or cuts it off according to whether the orifice of the flat bar is aligned with those of the bushings or not.

Although this device is easy and cheap to make in view of its simplicity, where use is concerned the effectivity is rather relative, since the first member may only be attached to pipelines of one sole diameter or to a limited range of diameters, while the watertightness of the second member is very imperfect, allowing water to leak out easily in the closed position.

These and other problems which may be derived therefrom are solved with the device of the present invention, the device retaining the structural simplicity and, therefore, a low cost and having other advantages which the known devices do not.

Thus, in the new device the support member holding the connecting bushing to the pipeline is formed by an annular body in the opening of which the bushing is inserted and held by the upper mid portion thereof, said holding being more reliable than in the known devices.

Furthermore, the annular body comprises a widened portion at one side and a flexible strip at the other side, which strip is provided with longitudinal teeth with which, once placed around the region of the pipeline from where the water is to be taken and the strip has been inserted in an opening of the widened portion, it engages a toothed portion thereof.

This strip is sufficiently long to allow the support member to be attached to different types of pipelines having different diameters, without the diameter of the latter being any obstacle.

With respect to the member inserted in the conduit, this has the form of a tubular sleeve member in the interior of which the plug of the stopcock rotates. This plug comprises a side area having a recess housing a resilient seal which, in the closed position of the stopcock, perfectly seals the water inlet orifice without any possibility of leaks therethrough.

This member is also provided on the lateral periphery thereof, further to the two opposite bushings connecting to the two parts of the necessary division of the conduit with which the water is drawn, a third bushing with which said water may be diverted towards another conduit other than the one contemplated in principle if so required at any given time.

To close the stopcock or divert the water towards one line or another, the member comprises stop and stabilization means so that the plug of the stopcock may rotate through 180° in two steps of 90° to take on three positions, one in which the water flow is cut off, another one placing the two opposites bushings in communication and the third one placing the water inlet bushing in communication with the third bushing.

These and other features will be more easily understood from the detailed description which follows, which is facilitated by three sheets of accompanying drawings in which one practical embodiment, given only as a non-limiting example of the scope of the invention, has been shown.

Figure 2:
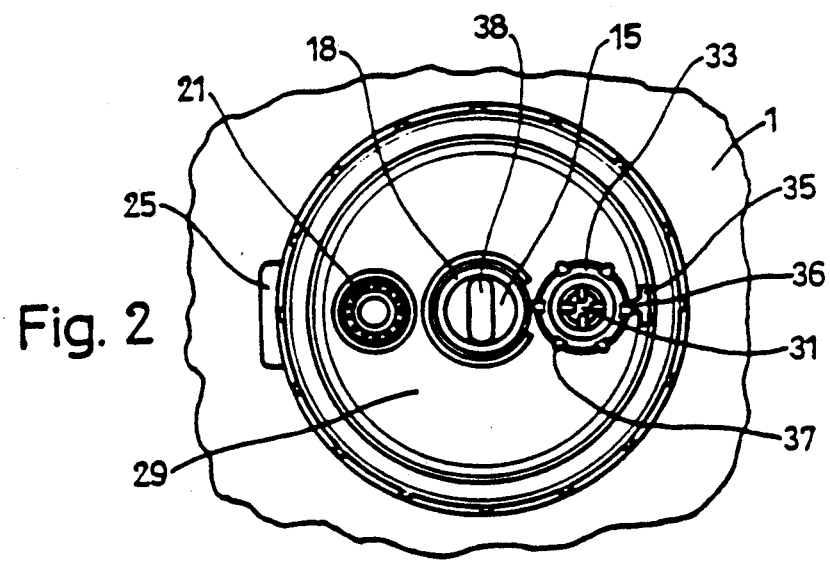
Figure 3:
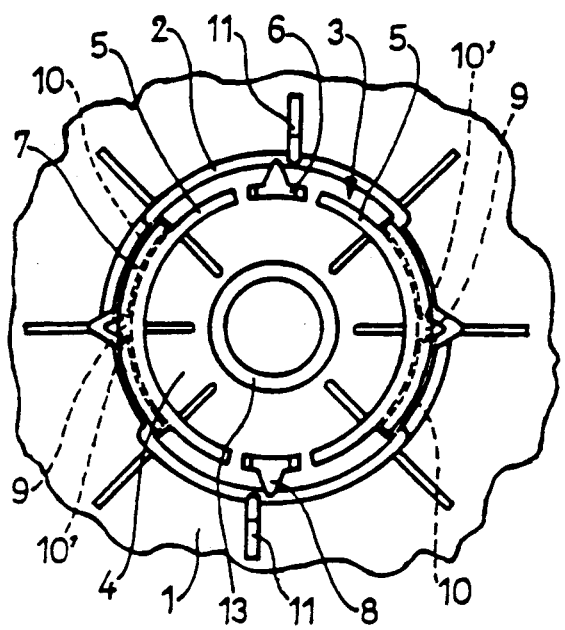
Figure 4:
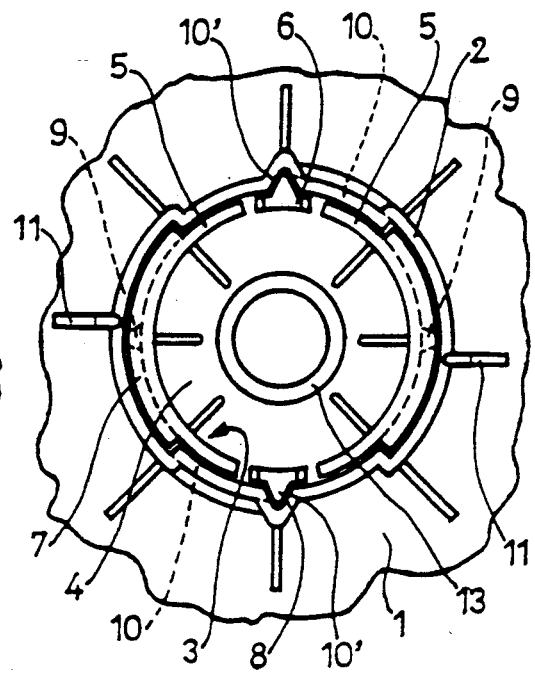
Figure 5:
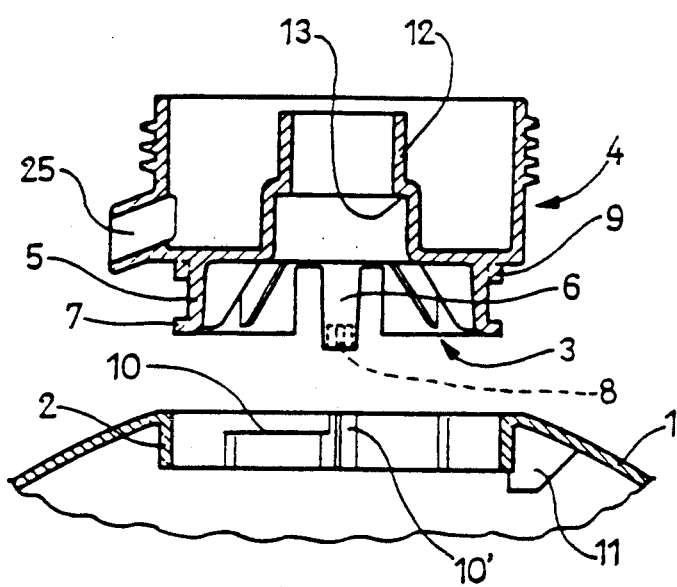

In the drawings:

FIG. 1 is an elevation view of part of the drinker corresponding to the support, valve and adjustment means, FIG. 2 is a plan view of the part of the drinker illustrated in FIG. 1, FIG. 3 is a plan view from below of the coupling of the drinker hood to the sleeve member screwed on the cup-shaped cover, FIG. 4 is also a plan view from below of the same ports as shown in FIG. 3, but with the drinker hood rotated in 90° and ready for dismantling, FIG. 5 is an elevation view in section of the sleeve member which is screwed on the cup-shaped cover, and of the upper portion of the drinker hood, in dismantled mode, FIG. 6 is a perspective view of the water tab device connecting a conduit to a pipeline, FIG. 7 is a front elevation view in section of the same device, and FIG. 8 is a side elevation view, in section of the member, of the device, inserted in the conduit.

According to these Figures, the illustrated drinker comprises a hood 1 which is provided with an upper opening having an inner neck 2 and which is terminated at the bottom in a channel-shaped skirt (not shown) forming the drinker as such.

The neck 3 of the sleeve member 4 is inserted in the neck 2 of the hood 1, both necks being held together by rotating the hood 1 in 90°, operating the same way but in the opposite direction to disconnect them.

This attachment is achieved because the neck 3 of the sleeve member 4 is divided into two segments 5 and two tabs 6 which are terminated at the bottom in respective external edges 7 and teeth 8 forming a lower portion of said neck 3 which may engage the said neck 3 comprising the neck 2 of the hood 1. Once has been inserted in the neck 2, said lower portion extends there beyond, both necks being held together by the aforementioned rotation.

The two parts are locked together by respective teeth 9 on the intermediate areas of the intersections of the sleeve member 4 with the segments 5 of the neck 3 thereof and which after sliding over respective shoulders 10 of the neck 2 of the hood 1 abut non-stepped portions 10' thereof.

Two vertical gusset members 11 disposed inside of the hood 1 between the body and the neck 2 thereof extend downwardly from said neck 2, and are located facing each other but oppositely displaced with respect to a radial position thereof so that when the neck 2 of the hood 1 is rotated in the neck 3 of the sleeve member 4, said gussets 11 strike against the teeth 8 of the tongues 6, overcoming the resistance thereof in view of the elasticity thereof and are located at the other side of the tongues, thereby blocking the attachment of the hood 1 to the sleeve member 4.

The hood 1 bears by way of an upper centre neck 12 having a shoulder 13 comprising the sleeve member 4 held thereto, on a helical spring 14 inserted over the support column 15 and which bears at the bottom end against an annular rib 15' of the support column 15 which bears on the upper open end 16 of a tapering cover 17 with which the counterweight (not shown) is closed, which will comprise the corresponding ballast.

The valve body of the drinker is mounted snugly around the upper portion of the support column 15 and is formed by a tubular member 18 having radially extending therefrom a parallel tubular appendage 19 which is terminated at the upper end thereof with a vertical tube 20 having an internally flaped opening and an external thread 21 for connection of the conduit c through which the water is supplied to the drinker. Other forms of terminations of the vertical tube 20 are contemplated.

At the lower end the tubular member 18 widens to form a circular cylinder 22 having an externally threaded periphery 23 and which at a point opposite the tubular appendage 19 forms an upper spout 24 for the flow of water towards the drinker through a downwardly sloping lateral tube 25 mounted in the sleeve member 4.

To the lower open end of said widened portion 22 there is threadedly connected an annular cover 26 which fits on the lower edge of said widened portion 22 and on the lower edge of the tubular member 18 by respective O-rings 27 and 28.

The opening of the cup-shaped cover 29 is threadedly connected to the open end of the sleeve member 4 and in the former, facing the said spout 24, there is a resilient stopper member 30 attached to the lower end of a stem 31 which is freely inserted in an upper tubular widened portion 32 of said cup-shaped cover 29, extending therefrom and having attached to the upper end thereof a blind nut 33 which, in turn, is threadedly connected to the outer thread of the widened portion 32.

The support column 15 comprises at the upper end thereof a shoulder 34 on which there bears the tubular member 18, the upper portion of which, like the tube 20 of the tubular appendage 19 thereof, pass through respective orificies of the cup shaped cover 29.

By rotating the blind nut 33 in one direction or the other, the stem 31 moves upwardly or downwardly, carrying the stopper 30 towards or away from the spout 24 of said tubular member 18, thereby regulating the water inflow.

The cup-shaped cover 29 also comprises, paralelly to the tubular widened portion 32, a vertical upper projection 35 in the form of a flat bar, which is provided with a center rib 36 facing the tubular widened portion 32 and with which radial ribs 37 of the blind nut 33 engage, maintaining the position adjusted thereby.

Finally, the support column 15 is terminated at the upper end thereof by a ring 38 with which the drinker may be suspended from the pertinent hook.

The water intake device consists of two members 39 and 40 which are respectively connected to the end of a conduit c, with which the water will be drawn off, and to an intermediate portion of the same conduit c.

The member 39 is formed by an annular body 41, the opening 42 of which is provided with a lower shoulder 43 so that, once a bushing 44 is inserted therein, the upper middle portion of said bushing may be housed in the opening 42, being held therein by a peripheral circular widened diameter portion 45 comprising the bushing 44 and which bears against the shoulder 43 of the annular body 41.

On the bushing 44 there is mounted a resilient joint 46 which is partially inserted in the opening 42 so that the upper portion thereof may fit against the pipeline t from the which the water is to be drawn, once the bushing 44 has been inserted in the orifice of said pipeline.

To this end, once the lower portion of the bushing 44 has been inserted in the conduit c, the annular body 41 is attached to the pipeline t by means of a flexible strip 47 which extends from one of the sides thereof and with which the portion of the tube of the pipeline t from which it is desired to draw the water is surrounded, the end thereof being inserted thereafter in a centre vertical opening 48 provided in a prismatic protuberance 49 of the annular body 41 on the opposite side from which the flexible strip 47 extends.

The flexible strip 47 comprises longitudinally on the inner surface thereof a toothed 50, the part whereof which penetrates in the opening 48 engages a further toothed portion 51 of said opening 48, said toothed portion 51 being disposed on a sort of tab 52 of the opening 48 to provide a certain degree of elasticity ensuring attachment and at the same time the possibility of releasing said strip if required. Furthermore, the toothed portions 50 and 51 are triangular shaped to ensure their engagement.

The member 40 is formed by a sleeve member 53 from the lateral periphery of which there extend two bushings 54 and 55 located on opposite sides thereof and to which there are connected the two parts into which the conduit c is divided to be able to insert this member, which also comprises a third intermediate bushing 56 (FIG. 8), which is shorter and is threaded on the outside to be able to receive a blind sealing nut (not shown) when not used or a further bushing 57 having a holding nut 58 for connection to a conduit d allowing the water supply to be diverted.

On the tubular member 53 there is mounted a stopcock 59 comprising a cylindrical plug 60 disposed in an intermediate area of a stem 61 situated between two passages 62 and 63 provided with joints 62' and 63' which fit in internal cylindrical portions of corresponding diameter of the tubular member 53. From the opposite side to the inlet to the stopcock there extends the end thereof comprising a further passage 64 to which a safety clip 65 is connected, the stopcock 59 being held in the tubular member 53.

The stopcock 59 may be rotated, having a stroke of 180° limited by two step members 66 and 66' provided on the tubular member 53 against which a tab 67 of the stopcock 59 may engage.

Likewise, the tubular member 53 comprises in the middle of the semicircular area along which the tab 67 moves, parallel transverse projections 68 which, when the stopcock 59 is rotated in 90°, may retain said tab therebetween, setting an intermediate position between the stop members 66 and 66'.

When the stopcock 59 is in the position in which the tab 67 is located between the projections 68, a transversely open portion 69 of the plug 60 is aligned in the open position with the orifices of the bushings 54 and 55, whereby the water or other liquid flowing through the pipeline t and which has entered through the upper portion of the conduit c flows freely to the other portion of the same conduit c.

If the stopcock 59 is moved to the position of abutment with the stop 66, an open portion 70 of the plug 60, which communicates with the open portion 69 and which is the previously described position was closed as being engaged with a wall of the tubular member 53, becomes aligned with the bushing 54, with the open portion 69 aligning with the bushing 56 and with the said wall of the tubular member 53, whereby the water will be diverted to the conduit d connected to the bushing 56 by way of further bushing 57.

On the contrary, when the stopcock 59 is situated in engagement with the stop member 66' (which is the position illustrated in the drawings) a resilient block 71 housed in a lateral housing 72 of the plug 60 is engaged against the water inlet portion of the tubular member 53, i.e., against the inner edge of the orifice of the bushing 54, thereby shutting the stop-cock.

The invention, within its essence, may be embodied in other forms which differ only in detail from the one described as an example and which will also fall under the scope of protection claimed.

We claim:

1. A poultry drinking apparatus, comprising:
   a counterweight from which there extends a support column;
   a drinker hood;
   a valve body detachably threaded to the support column, the valve body being connected to a water intake device; and
   a lower sleeve member disposed at least partly below the valve body, the sleeve member being detachably attached to the hood;
   a spring upon which the lower sleeve member is supported, the spring being mounted around the support column; and
   an upper cup-shaped cover being disposed at least partly above the valve body to cover the valve body, the cup-shaped cover being removably threaded to the lower sleeve member; the cup-shaped cover also comprising an adjusting means for adjusting water flow to the drinker hood from the valve body, the adjusting means comprising:
a resilient stopper, a stem and a blind nut, one end of the stem engaging the resilient stopper, another end of the stem being engaged by the blind nut to move the resilient stopper to adjust said water flow to the drinker hood.

2. The poultry drinking apparatus of claim 1, wherein the stem slidably engages an inside surface of a tubular portion of the cup-shaped cover, the blind nut being threaded to a thread on an external surface of said tubular portion, the resilient stopper adjustably sealing a water spout of the valve body to control said water flow to the drinker hood through said water spout.

3. The poultry drinking apparatus of claim 2, wherein said cup-shaped cover also comprises a bar-like projection which extends substantially parallel to the axis of the tubular portion of the cup-shaped cover, the blind nut having radially extending ribs, the bar-like projection of the cup-shaped cover stabilizing a position of the blind nut relative to the tubular portion by contacting the radially extending ribs.

4. The poultry drinking apparatus of claim 1, wherein the lower sleeve member comprises at least one annular segment member which rotatably and slidably engages an annular neck of the hood.

5. The poultry drinking apparatus of claim 1, wherein an annular neck of the hood comprises at least one downwardly extending vertical gusset member, and wherein the lower sleeve member comprises at least one tongue member which contacts said one vertical gusset member to lock the lower sleeve member onto the annular neck of the hood.

6. The poultry drinking apparatus of claim 5, wherein said at least one tongue member has a resilience so that rotation of the lower sleeve member rotates in a rotational direction in the annular neck causes the tongue member to engage and then slide over said at least one downwardly extending vertical gusset member so as to lock the lower sleeve member into the annular neck.

7. The poultry drinking apparatus of claim 1, wherein the lower sleeve member comprises an output conduit means for conducting said water flow from inside to outside the lower sleeve member.

8. The poultry drinking apparatus of claim 1, wherein the water intake device comprises:
pipeline means with an axis for conducting a supply of water;
first conduit means with an axis for conducting water from said pipeline means to a conduit valve; and
a second conduit means with an axis for conducting water from said conduit valve water to said valve body;

9. The poultry drinking apparatus of claim 8, wherein the pipeline means is connected to the first conduit means by a connecting member, said connecting member comprising a tubular bushing with an axis, a body portion with a strip attached to one side and a gripping opening disposed on another side, and a resilient seal,
one end of said tubular bushing extending coaxially into the first conduit means, another other end of said tubular bushing extending through a hole in said pipeline means so that the axis of said tubular bushing is substantially perpendicular to the axis of the pipeline means, the body portion holding said another end of the tubular bushing inside the pipeline means with the resilient seal being sandwiched between the pipeline means and the body portion, the strip of the body portion holding the body portion to the pipeline by being wrapped around a radial portion of the pipeline and being gripped to the body portion by said gripping opening through which the strip extends.

10. The poultry drinking apparatus of claim 8, wherein the conduit valve is a stopcock which has a tubular valve body, two opposite tubular bushings and one intermediate tubular bushing extending from an inner annular surface of the tubular valve, body, one of the opposite bushings coaxially extending into the first conduit means, the second of the opposite bushings coaxially extending into the second conduit means, a cylindrical valve plug with a resilient stop member being disposed inside the tubular valve body so that the cylindrical plug can rotate inside the tubular valve body into at least two positions, one position connecting the first conduit means and the second conduit means, the second position connecting the intermediate bushing and the second conduit means while the resilient stop member cuts off flow from the first conduit means.

11. A poultry drinking apparatus, comprising:
a trough supporting means for supporting a trough, said supporting means having an annular neck;
a counterweight member comprising a weighted portion and a support column portion, the support column portion having an axis, the supported column portion extending in an axial direction from said weighted portion;
a compression means disposed between the counterweight member and the trough supporting means for compressing to different amounts depending on the weight of the trough and the trough supporting means; and
a valve member comprising:
a first part fixed to said support column portion, said first part having an inlet means for supplying water to a stopper sealing orifice formed in the first part, said stopper sealing orifice having an axis which extends substantially parallel to but radially displaced from said axis of the support column;
a second part comprising a body portion and a stopper, said body portion being removably fitted to said annular neck, said body portion having an annular neck means for slidably engaging said support column portion, said stopper being disposed at least partially inside said body portion, said stopper being capable of sealing with said stopper sealing orifice to stop water flow through said stopper sealing orifice, said second part having an outlet means for outletting from the second part said water flow, said stopper being movable in the axial direction of the stopper sealing orifice to an adjustable distance with respect to said body portion, said second part also comprising an adjusting means for adjusting said adjustable distance, said adjusting means engaging said stopper and being disposed at least partially outside said body portion.

12. The poultry drinking apparatus of claim 11, wherein said adjusting means comprises a rotatable threaded member which engages threads on said body portion, rotation of said rotatable threaded member in a rotational direction and in the opposite rotational direction causes said adjustable distance to increase and decrease, respectively.

13. The poultry drinking apparatus of claim 11, wherein said body portion is removably fitted to said annular neck by tab segments on the body portion which engage a lip of said annular neck.

14. The poultry drinking apparatus of claim 13, wherein relative rotation between the body portion and the annular neck of approximately plus and minus a quarter of a turn causes said tab segments and said lip to engage and disengage each other, respectively.

15. A poultry drinking apparatus, comprising:
a reservoir supporting means for supporting a reservoir;
a counterweight member having a support column portion which extends in an axial direction; and
a valve member having an axis, the axis of the valve member being disposed radially from but parallel to the axis of the support column portion of the counterweight member, the valve member comprising:
a first part fixed to one of the support column portions and the reservoir supporting means, said first part having first conduit means for conducting water between a stopper sealing orifice formed in the first part and outside the valve member, the stopper sealing orifice having an axis which is the axis of the valve member;
a second part fixed to the other of the support column portion and the reservoir supporting means, the second part having a second conduit means for conducting water between said stopper sealing orifice and outside the valve member, the second part also having a tubular member having an axis which is the axis of the valve member;
a stopper means, disposed for engaging the stopper sealing orifice, for regulating water flow through the stopper sealing orifice by movement along the axis of the valve member means with respect to the tubular member of the second part; and
a stopper adjusting means for adjusting a distance with which said stopper means is disposed with respect to the tubular member of the second part, rotation of the stopper adjusting means about the axis of the valve member in one rotational direction increases said distance, rotation of the stopper adjusting means about the axis of the valve member in an opposite rotational direction decreases said distance.

16. The poultry drinking apparatus of claim 15, wherein said stopper adjusting means comprises a cap, an inside annular surface of said cap having threads which rotatably engage threads on an outside annular surface of the tubular member.

17. The poultry drinking apparatus of claim 16, wherein said cap comprises a part of an outside surface of said poultry drinking apparatus so that said cap is exposed for easy adjustment.

* * * * *